US 6,629,604 B2

(12) United States Patent
Flacker

(10) Patent No.: US 6,629,604 B2
(45) Date of Patent: *Oct. 7, 2003

(54) PACKAGED PRODUCT WITH A FOIL WRAPPER HAVING A PERFORATION FOR OPENING THE FOIL WRAPPER

(75) Inventor: Günther Flacker, Weiden am See (AT)

(73) Assignee: Koninklijke Philips Electronics N.V., Eindhoven (NL)

(*) Notice: Subject to any disclaimer, the term of this patent is extended or adjusted under 35 U.S.C. 154(b) by 8 days.

This patent is subject to a terminal disclaimer.

(21) Appl. No.: 10/152,116

(22) Filed: May 21, 2002

(65) Prior Publication Data

US 2002/0153274 A1 Oct. 24, 2002

Related U.S. Application Data

(63) Continuation of application No. 09/600,463, filed as application No. PCT/EP99/08957 on Nov. 17, 1999, now Pat. No. 6,427,840.

(30) Foreign Application Priority Data

Nov. 18, 1998 (EP) .............................. 98890344

(51) Int. Cl.⁷ ............................................ B65D 85/575
(52) U.S. Cl. ..................... 206/497; 206/387.1; 383/207
(58) Field of Search ................ 206/387.1, 387.13, 206/497; 383/207–209

(56) References Cited

U.S. PATENT DOCUMENTS

| 3,365,100 A | * | 1/1968 | Piazze ........................ 221/302 |
| 5,605,230 A | * | 2/1997 | Marino, Jr. et al. ......... 206/497 |
| 5,722,774 A | * | 3/1998 | Hartz .......................... 383/207 |
| 5,934,470 A | * | 8/1999 | Bauer et al. ................. 206/497 |

FOREIGN PATENT DOCUMENTS

| DE | 9109154 | * | 10/1991 |
| EP | 0577509 | * | 1/1994 |
| EP | 0644127 | * | 3/1995 |
| FR | 2103361 | * | 4/1972 |

* cited by examiner

*Primary Examiner*—Jim Foster

(57) ABSTRACT

In a packaged product (1) including a non-packaged product (2), including container (3) and a foil wrapper (13) which wholly envelops the container (3) together with the non-packaged product (2) accommodated therein the foil wrapper (13) is made of a heat-shrinkable foil (14) and the foil wrapper (13) only has perforation holes (19) forming a perforation (18) in its area which lies against the a container wall (4, 5, 8), and the foil wrapper (13) has no perforation holes in its area which covers an opening (10) in the container (3).

3 Claims, 1 Drawing Sheet

PACKAGED PRODUCT WITH A FOIL WRAPPER HAVING A PERFORATION FOR OPENING THE FOIL WRAPPER

CROSS REFERENCE TO RELATED APPLICATIONS

This is a continuation of application Ser. No. 09/600,463, filed Jul. 17, 2000 now U.S. Pat. No. 6,427,840 which is a 371 of PCT/EP99/08957 filed Nov. 17, 1999.

FIELD OF THE INVENTION

The invention relates to a packaged product including a non-packaged product and including a container which accommodates the non-packaged product and which has at least one container wall and at least one opening which allows access to the non-packaged product, and including a foil wrapper which wholly envelops the container together with the non-packaged product accommodated therein and which lies against the at least one wall and covers the opening in the container and is made of a heat-shrinkable foil and has been provided with a perforation which comprises a succession of adjacent perforation holes and extends over a given circumferential portion of the packaged product, which perforation extends parallel to a cross-sectional zone of the container, the cross-sectional zone extending across the opening in the container.

BACKGROUND AND SUMMARY

Such a packaged product of the type defined in the opening paragraph has been put onto the market by the Applicant and is consequently known. The known packaged product includes a magnetic-tape cassette as non-packaged product, which cassette is accommodated in a book-cover type container having two main walls, two short side walls and one long side wall and having no wall in the area of the narrow side opposite the long side wall, in which area it has the opening for access to the magnetic-tape cassette. The book-cover type container together with the magnetic-tape cassette contained therein is enclosed in a foil wrapper of a heat-shrinkable foil. The foil wrapper of the known packaged product has a perforation for easy opening of the foil wrapper, the perforation being situated in a cross-sectional plane of the container, which plane extends parallel to the two short side walls of the container, and extending over both main walls of the container as well as over the long side wall of the container and over the container opening which faces the one long side wall of the container. As a result of this design of the perforation the perforation extends not only in areas in which the heat-shrinkable foil lies against the walls of the container but also in the area in which the perforation lies across the opening in the container. In this area the inner side of the heat-shrinkable foil does not lie against a container wall but extends freely at a small distance from the magnetic-tape cassette in the container. Owing to the design described above the known packaged product exhibits the problem that during the heat shrinking process, in which the sealed foil wrapped around the container including the magnetic-tape cassette is subjected to shrinking under the influence of heat, the foil is likely to be torn open inadvertently in the area where the perforation extends across the opening in the container, which not only detracts from the appearance but which is particularly unfavorable because it readily allows the ingress of dust and liquid or at least moisture into the interior of the packaged product at the torn-open spots, which is disadvantageous and therefore undesirable.

It is an object of the invention to preclude the aforementioned problems and to provide an improved packaged product for which tearing open of the perforation as a result of heat-shrinking of the heat-shrinkable foil has been precluded.

According to the invention, in order to achieve this object with a packaged product of the type defined in the opening paragraph the foil wrapper only has perforation holes forming the perforation in its area which lies against the at least one container wall, and the foil wrapper has no perforation holes in its area which covers the opening in the container.

By taking the measures in accordance with the invention it is achieved in a very simple manner that the perforation of a packaged product in accordance with the invention extends only in those areas where the heat-shrinkable foil lies directly against a wall of the container of the packaged product, which has the advantage that during a heat-shrinking process the heat applied to the foil in the area of the perforation can readily be transferred to the underlying walls of the container, as a result of which the perforation is not subjected to any significant mechanical loads resulting from the application of heat and, consequently, no undesired tearing open of the foil along the perforation in the areas in which the perforation directly adjoins the container walls underneath it, and which further has the advantage that there is no perforation at all in the foil area which extends over the opening in the container, as a result of which tearing open along a perforation is neither possible in this area.

In a packaged product in accordance with the invention the perforation may extend up to a location directly at the edge of the opening in the container. However, it has proved to be advantageous if the measures as defined in claim 2 are taken, because as a result of this the likelihood that the foils is not torn open in its area which covers the opening is particularly great.

A packaged product in accordance with the invention may include for example as non-packaged product a perfume bottle accommodated in a container in the form of a folding box, the folding box having at least one opening to display the perfume bottle. A multitude of further variants of the packaged product in accordance with the invention are possible. It has proved to be particularly advantageous if a packaged product in accordance with the invention has the characteristic features as defined in claim 3.

The above-mentioned as well as further aspects of the invention will become apparent from the embodiment described hereinafter by way of example and will be elucidated with reference to this example.

BRIEF DESCRIPTION OF THE DRAWING FIGURES

The invention will now be described in more detail with reference to the drawing, which show an embodiment given by way of example but to which the invention is not limited.

DETAILED DESCRIPTION

Figure 1:
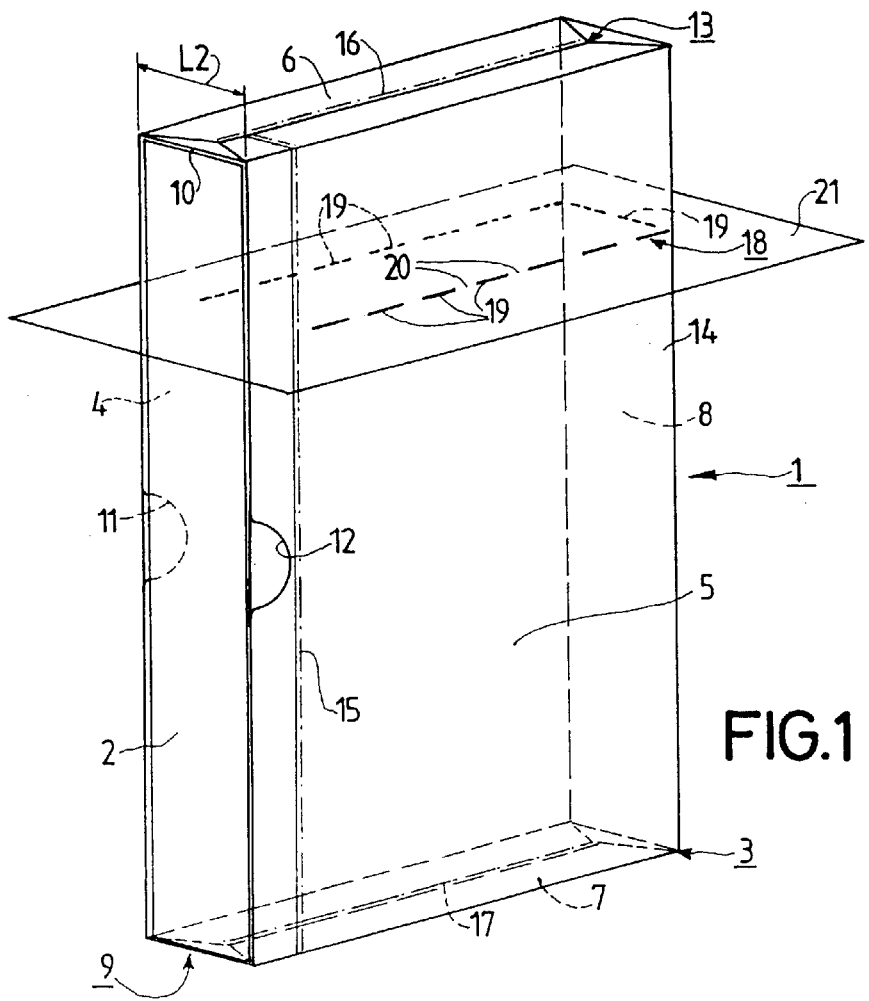
FIG. 1 is an oblique plan view of a packaged product in accordance with and embodiment of the invention, which packaged product includes a foil wrapper of a heat-shrinkable foil.

FIG. 1 shows a packaged product 1 which includes a magnetic-tape cassette 2 as a non-packaged commercially available product. The magnetic-tape cassette 2 is box-shaped and is accommodated in a container 3. The container 3 has a first main wall 4, a second main wall 5, a first short side wall 6, a second short side wall 7 and a long side wall 8. The container 3 does not have a wall in the area of the narrow side 9 opposite the long side wall 8, in which area the container has an opening 10. The opening 10 provides access to the magnetic-tape cassette 2. In order to facilitate removal of the cassette 2 from the container 3 and replacing it into the container 3 the opening 10 has a receding portion, 11 or 12, in the area of each of the two main walls 4 and 5, respectively.

Figure 2:
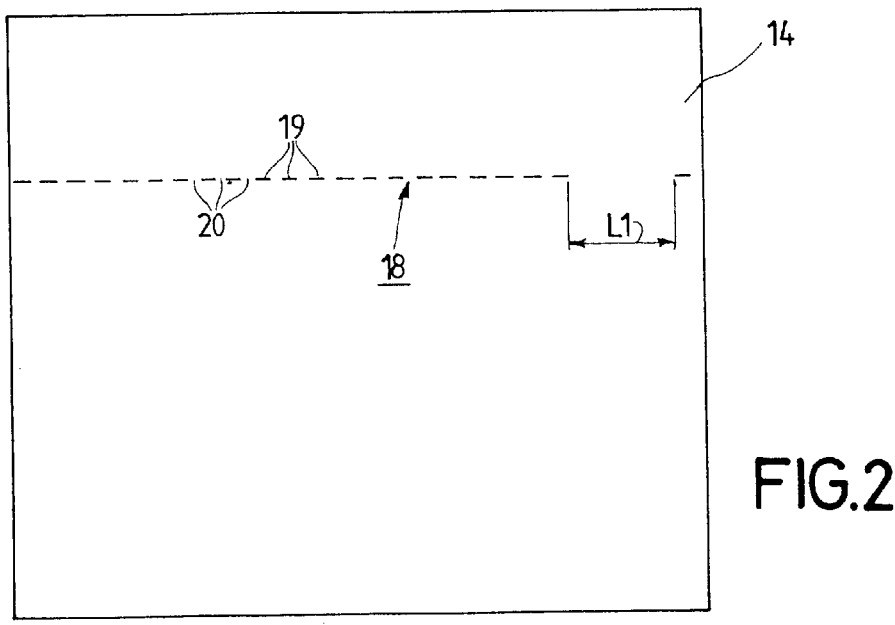
FIG. 2 is a plan view of the heat-shrinkable foil of the foil wrapper of the packaged product shown in FIG. 1.

The packaged product 1 has further been provided with a foil wrapper 13 which wholly encloses the container 3 together with the magnetic-tape cassette 2 accommodated therein and which fits tautly around the container walls 4, 5, 6, 7 and 8 and which further covers the opening 10 in the container 3. The foil wrapper 13 comprises a heat-shrinkable foil 14, shown in FIG. 2, which is transparent in the present case but which may also be provided with print and may thus be opaque.

During the manufacture of the packaged product 1 the foil 14 is cut from a long web of foil and is the wrapped around the container 3 including the cassette 2, after which the foil 14 is subsequently heat-sealed in the area of a sealing zone 15 shown as a dash-dot line in FIG. 1 and situated in the area of the end portions which overlap after said foil has been wrapped around the container 3, and after sealing along the sealing zone 15 the foil 14 is folded in the areas of the short side walls 6 and 7 of the container 3 and is also sealed along sealing zones 16 and 17. Subsequently, the packaged product 1 is passed through a heating station, in which a heat treatment is carried out, as a result of which the heat-shrinkable foil 14 shrinks in comparison with its initial condition and consequently lies tautly against all the walls 4, 5, 6, 7 and 8 of the container 3. This heat-shrinking of the foil 14 further causes the foil 14 to cover the opening 10 of the container 3 in a taut condition.

The foil wrapper 13 and, consequently, the heat-shrinkable foil 14 are provided with a perforation 14 so as to allow easy opening of the foil wrapper 13, which perforation comprises a succession of adjacent perforation holes 19 formed by cuts made, for example, by means of a toothed cutter wheel. The perforation holes 19, which are slit-shaped in the present case but which may alternatively have a circular or oval shape, have foil portions 20 between them. The perforation 18 extends over a given circumferential portion of the packaged product 1, as will be described in more detail hereinafter. The perforation 18 extends parallel to a cross-sectional zone of the container 3, the cross-sectional zone extending across the opening 10 in the container 3. In the present case, the cross-sectional zone is represented diagrammatically as a cross-sectional plane 21 in FIG. 1, which extends parallel to the two short side walls 6 and 7 of the container 3. However, the cross-sectional zone may alternatively be curved.

Advantageously, the perforation 18 for the packaged product 1 is made in such a manner that the foil wrapper 13 only has perforation holes 19 in its area where it lies against the container walls 4, 5 and 8 and that in the area which covers the opening 10 in the container 3 the foil wrapper 13 is without perforation holes. An additional advantageous measure is that the length L1 (see FIG. 2) of the part of the foil wrapper 13 without perforation holes is greater than the dimension L2 (see FIG. 1) of the opening 10 in the area covered by the non-perforated part of the foil wrapper 13. As a result of this advantageous design the perforation 18 extends over a large part of the two main walls 4 and 5 of the container 3 and over the long side wall 8 of the container 3. However, the perforation 18 does not extend up to the edge of the main wall 4 or 5 which adjoins the narrow side 9 of the container 3.

As a result of the advantages design of the foil wrapper 13 it is achieved that during heat-shrinking of the foil wrapper 13, and, as a consequence, the foil 14 no undesired tearing open of the foil 14 along the perforation 18 takes place and, consequently, no undesired tearing of the foil 14 in its non-perforated area which covers the opening 10 in the container 3.

What is claimed is:

1. A packaged product comprising:

a non-packaged product;

a container which accommodates the non-packaged product and which has at least one container wall and at least one opening which allows access to the non-packaged product; and a foil wrapper which wholly envelops the container together with the non-packaged product accommodated therein and which lies against the at least one wall and covers the opening in the container and is made of a heat-shrinkable foil and has been provided with a perforation which comprises a succession of adjacent perforation holes and extends over a given circumferential portion of the packaged product, which perforation extends parallel to a cross-sectional zone of the container, the cross-sectional zone extending across the opening in the container, wherein the foil wrapper only has perforation holes forming the perforation in its area which lies against the at least one container wall, and the foil wrapper has no perforation holes that extend substantially close to any opening in the container that allows access to the non-packaged product.

2. A packaged product comprising:

a non-packaged product;

a container that accommodates the non-packaged product and which has at least one container wall and at least one opening which allows access to the non-packaged product; and a foil wrapper that wholly envelops the container together with the non-packaged product accommodated therein and which lies against the at least one wall and covers the opening in the container and is made of a heat-shrinkable foil and has been provided with a perforation that comprises a succession of adjacent perforation holes and extends over a given circumferential portion of the packaged product, which perforation extends parallel to a cross-sectional zone of the container, the cross-sectional zone extending across the opening in the container, wherein:

the foil wrapper only has perforation holes forming the perforation in its area which lies against the at least one container wall;

the foil wrapper has no perforation holes in its area which covers the opening in the container; and the length of the part of the foil wrapper without perforation holes is greater than the dimension of the opening in the container in the area covered by the part of the foil wrapper not having any perforation holes.

3. A packaged product comprising:

a non-packaged product;

a container that accommodates the non-packaged product, has at least one container wall, and has at least one opening that allows access to the non-packaged product; and a foil wrapper that wholly envelops the container together with the non-packaged product accommodated therein, lies against the at least one wall, covers the opening in the container, is made of a heat-shrinkable foil, and has been provided with a perforation that includes a succession of adjacent perforation holes and extends over a given circumferential portion of the packaged product, which perforation extends parallel to a cross-sectional zone of the container, the cross-sectional zone extending across the opening in the container, wherein:

the foil wrapper only has perforation holes forming the perforation in its area which lies against the at least one container wall;

the foil wrapper has no perforation holes in its area which covers the opening in the container;

the non-packaged product is formed by a magnetic-tape cassette having a box-shaped housing;

the container is of the book-cover type, has two main walls, two short side walls, and one long side wall, and does not have a wall in the area of the long narrow side opposite the long side wall, in which area it has the opening for access to the magnetic-tape cassette accommodated in the book-cover type container as non-packaged product; and the perforation extends in a cross-sectional plane of the container, which plane extends parallel to the two short side walls and extends over a large part of the two main walls of the container and over the long side wall of the container.

* * * * *